(12) United States Patent
Sato et al.

(10) Patent No.: US 10,429,848 B2
(45) Date of Patent: Oct. 1, 2019

(54) AUTOMATIC DRIVING SYSTEM

(71) Applicant: TOYOTA JIDOSHA KABUSHIKI KAISHA, Toyota-shi, Aichi-ken (JP)

(72) Inventors: Kunihito Sato, Mishima (JP); Nobuhide Kamata, Susono (JP); Bunyo Okumura, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/989,805

(22) Filed: May 25, 2018

(65) Prior Publication Data

US 2018/0348769 A1 Dec. 6, 2018

(30) Foreign Application Priority Data

Jun. 2, 2017 (JP) .................... 2017-110394

(51) Int. Cl.
*G05D 1/02* (2006.01)
*B60W 50/00* (2006.01)
(Continued)

(52) U.S. Cl.
CPC .......... *G05D 1/0214* (2013.01); *B60W 30/02* (2013.01); *B60W 30/095* (2013.01); *B60W 30/143* (2013.01); *B60W 50/0098* (2013.01); *G05D 1/0274* (2013.01); *B60W 2420/42* (2013.01); *B60W 2420/52* (2013.01); *B60W 2520/10* (2013.01); *B60W 2520/105* (2013.01); *B60W 2520/12* (2013.01); *B60W 2520/125* (2013.01);
(Continued)

(58) Field of Classification Search
CPC .............. G05D 1/0214; G05D 1/0274; G05D 2201/0213; G05D 1/0088; B60W 30/143; B60W 30/095; B60W 50/0098; B60W 30/02; B60W 2420/42; B60W 2520/105; B60W 2720/106; B60W 2710/202; B60W 2720/10; B60W 2550/402; B60W 2520/14; B60W 2520/12; B60W 2520/10; B60W 2520/125; B60W 2420/52; B60W 2710/207
See application file for complete search history.

(56) References Cited

U.S. PATENT DOCUMENTS

2004/0193374 A1 9/2004 Hac et al.
2005/0043867 A1 2/2005 Kudo
(Continued)

FOREIGN PATENT DOCUMENTS

JP 11-039586 A 2/1999
JP 2005-067322 A 3/2005
(Continued)

*Primary Examiner* — Rodney A Butler
(74) *Attorney, Agent, or Firm* — Sughrue Mion PLLC (57) ABSTRACT

An automatic driving system includes an electronic control unit. The electronic control unit is configured to create a traveling plan including a control target value of automatic driving control of a vehicle based on a position of the vehicle of a map, a vehicle state, and an external environment, to calculate an abnormality value, to determine, based on the abnormality value, whether the vehicle is an a normal state, an abnormal state, or an intermediate state, and to create an abnormal traveling plan as the traveling plan when it has been determined that the vehicle is in the abnormal state.

10 Claims, 7 Drawing Sheets

(51) Int. Cl.
*B60W 30/02* (2012.01)
*B60W 30/09* (2012.01)
*B60W 30/14* (2006.01)
*B60W 30/095* (2012.01)
*G05D 1/00* (2006.01)

(52) U.S. Cl.
CPC ... *B60W 2520/14* (2013.01); *B60W 2550/402* (2013.01); *B60W 2710/202* (2013.01); *B60W 2710/207* (2013.01); *B60W 2720/10* (2013.01); *B60W 2720/106* (2013.01); *G05D 1/0088* (2013.01); *G05D 2201/0213* (2013.01)

(56) References Cited

U.S. PATENT DOCUMENTS

| | | |
|---|---|---|
| 2013/0197736 A1 | 8/2013 | Zhu et al. |
| 2014/0012435 A1 | 1/2014 | Sugihara |
| 2016/0004254 A1 | 1/2016 | Matsumoto et al. |
| 2016/0349751 A1 | 12/2016 | Sugimoto |
| 2018/0335776 A1* | 11/2018 | Theis ................... G05D 1/0088 |
| 2019/0061745 A1* | 2/2019 | Hatano ................. B60W 30/09 |

FOREIGN PATENT DOCUMENTS

| | | |
|---|---|---|
| JP | 2009-061942 A | 3/2009 |
| JP | 2009-061943 A | 3/2009 |
| JP | 2012-206551 A | 10/2012 |
| JP | 2013-544697 A | 12/2013 |
| JP | 2015-162005 A | 9/2015 |
| JP | 2016-013751 A | 1/2016 |
| JP | 2016-181032 A | 10/2016 |
| JP | 2017-047694 A | 3/2017 |
| WO | 2007/141063 A1 | 12/2007 |
| WO | 2012/047980 A2 | 4/2012 |
| WO | 2013/116141 A1 | 8/2013 |

* cited by examiner

AUTOMATIC DRIVING SYSTEM

INCORPORATION BY REFERENCE

The disclosure of Japanese Patent Application No. 2017-110394 filed on Jun. 2, 2017 including the specification, drawings and abstract is incorporated herein by reference in its entirety.

BACKGROUND

1. Technical Field

The disclosure relates to an automatic driving system.

2. Description of Related Art

PCT International Publication No. 2007/141063 is known as technical literature for a controller of a vehicle. In this publication, a method of adjusting two or more controllers for vehicle behavior that operate in parallel is described, in which the stability of each controller is evaluated in a first step, the stability of a group of controllers is evaluated in a second step, and the stability evaluation results of the controllers and the stability evaluation result of the group of controllers are compared in a third step. In this method, when a separation between the stability evaluation results of the controllers and the stability evaluation result of the group of controllers is large to an unallowable extent, interruption of the flow of control is carried out.

SUMMARY

In an automatic driving system, there may be state in which control of a vehicle based on a predetermined traveling plan cannot be realized due to external abnormality factors such as bad weather (a hydroplaning phenomenon, slipping due to snow, or the like). However, in the above-mentioned method, abnormality states have not been satisfactorily studied, in setting control target values for a vehicle in a traveling plan. Accordingly, in the above-mentioned method, there is concern that the vehicle behavior may become destabilized if an unrealizable control target value is set due to external abnormality factors and a vehicle state will approach a control limit in order to reach this control target value.

Therefore, the disclosure provides an automatic driving system that can create an appropriate traveling plan according to conditions of a vehicle.

An aspect of the disclosure provides an automatic driving system. The automatic driving system according to the aspect includes an electronic control unit configured to recognize a position of a vehicle on a map; recognize a vehicle state of the vehicle; recognize an external environment of the vehicle; create a traveling plan including a control target value of automatic driving control of the vehicle based on the position of the vehicle on the map, the vehicle state, and the external environment; execute the automatic driving control by transmitting, based on the control target value of the traveling plan, a command value to an actuator of the vehicle; calculate, during execution of the automatic driving control, an abnormality value based on the command value and the vehicle state corresponding to the command value; and determine, based on the abnormality value, whether the vehicle is an a normal state, an abnormal state, or an intermediate state, the intermediate state being a state between the normal state and the abnormal state, wherein the electronic control unit is configured to create a normal traveling plan as the traveling plan when it has been determined that the vehicle is in the normal state, create an abnormal traveling plan as the traveling plan when it has been determined that the vehicle is in the abnormal state, and create a previously created traveling plan as the traveling plan, the previously created traveling plan being the normal traveling plan or the abnormal traveling plan, when it has been determined that the vehicle is in the intermediate state, wherein in the abnormal traveling plan, at least one of the control target value, a maximum allowable value of the control target value, and a maximum allowable value of a temporal variation of the control target value is less than that in the normal traveling plan.

According to this configuration, since it is determined whether the vehicle is in the normal state, an abnormal state, or the intermediate state by calculating the abnormality value based on a command value for an actuator of the vehicle and a vehicle state corresponding to the command value during execution of automatic driving control and the normal traveling plan or the abnormal traveling plan is created based on the determination result, it is possible to create an appropriate traveling plan according to the vehicle state. With this automatic driving system, since the abnormal traveling plan is a traveling plan in which at least one of the control target value, the maximum allowable value of the control target value, and the maximum allowable value of the temporal variation of the control target value is less than that in the normal traveling plan, it is possible to curb destabilization of behavior of the vehicle when the vehicle is in the abnormal state in contrast to a case in which the vehicle is in the normal state.

In the aspect of the disclosure, the electronic control unit may be configured to create the abnormal traveling plan such that at least one of the control target value, the maximum allowable value of the control target value, and the maximum allowable value of the temporal variation of the control target value varies according to the abnormality value when it has been determined that the vehicle is in the abnormal state.

According to this configuration, since at least one of the control target value, the maximum allowable value of the control target value, and the maximum allowable value of the temporal variation of the control target value varies according to the abnormality value, it is possible to create an abnormal traveling plan in which the vehicle state is reflected in contrast to a case in which the maximum allowable value of the control target value or the like is set to a fixed value regardless of the abnormality value.

In the aspect of the disclosure, the electronic control unit may be configured to calculate a stabilization target value based on the vehicle state, calculate a composite target value of the control target value and the stabilization target value using a composite proportion corresponding to the abnormality value, and calculate the command value, based on the composite target value, the command value being transmitted to the actuator of the vehicle.

According to this configuration, since the command value which is transmitted to the actuator of the vehicle is calculated based on the composite target value corresponding to the abnormality value, it is possible to execute automatic driving control corresponding to the abnormality value of the vehicle and to curb destabilization of the vehicle.

In the aspect of the disclosure, the abnormal traveling plan may be a traveling plan in which at least one of a speed, a speed variation, a steering angle, and a steering angle variation is less than that of the normal traveling plan.

In the aspect of the disclosure, the electronic control unit may be configured to create the abnormal traveling plan as the traveling plan such that the maximum allowable value of the control target value in the abnormal traveling plan decreases as the abnormality value increases.

In the aspect of the disclosure, the electronic control unit may be configured to calculate the abnormality value based on an absolute value of a difference between the command value and the vehicle state corresponding to the command value.

In the aspect of the disclosure, the electronic control unit may be configured to determine that the vehicle is in the normal state when the abnormality value is less than a predetermined first threshold value, determine that the vehicle is in the intermediate state when the abnormality value is equal to or greater than the predetermined first threshold value and less than a predetermined second threshold value, and determine that the vehicle is in the abnormal state when the abnormality value is equal to or greater than the predetermined second threshold value, the predetermined second threshold value being greater than the predetermined first threshold value.

In the aspect of the disclosure, the electronic control unit may be configured to calculate the command value based on the composite target value when it has been determined that the vehicle is in the abnormal state, and calculate the command value based on the control target value when it has been determined that the vehicle is in the normal state or the intermediate state.

In the aspect of the disclosure, the electronic control unit may be configured to calculate the stabilization target value, the stabilization target value being a target value for stabilizing behavior of the vehicle.

In the aspect of the disclosure, the electronic control unit may be configured to calculate the composite target value such that an influence of the stabilization target value on the command value increases as the abnormality value increases.

As described above, with the automatic driving system according to an aspect of the disclosure, it is possible to create an appropriate traveling plan according to conditions of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings.

First Embodiment

Figure 1:
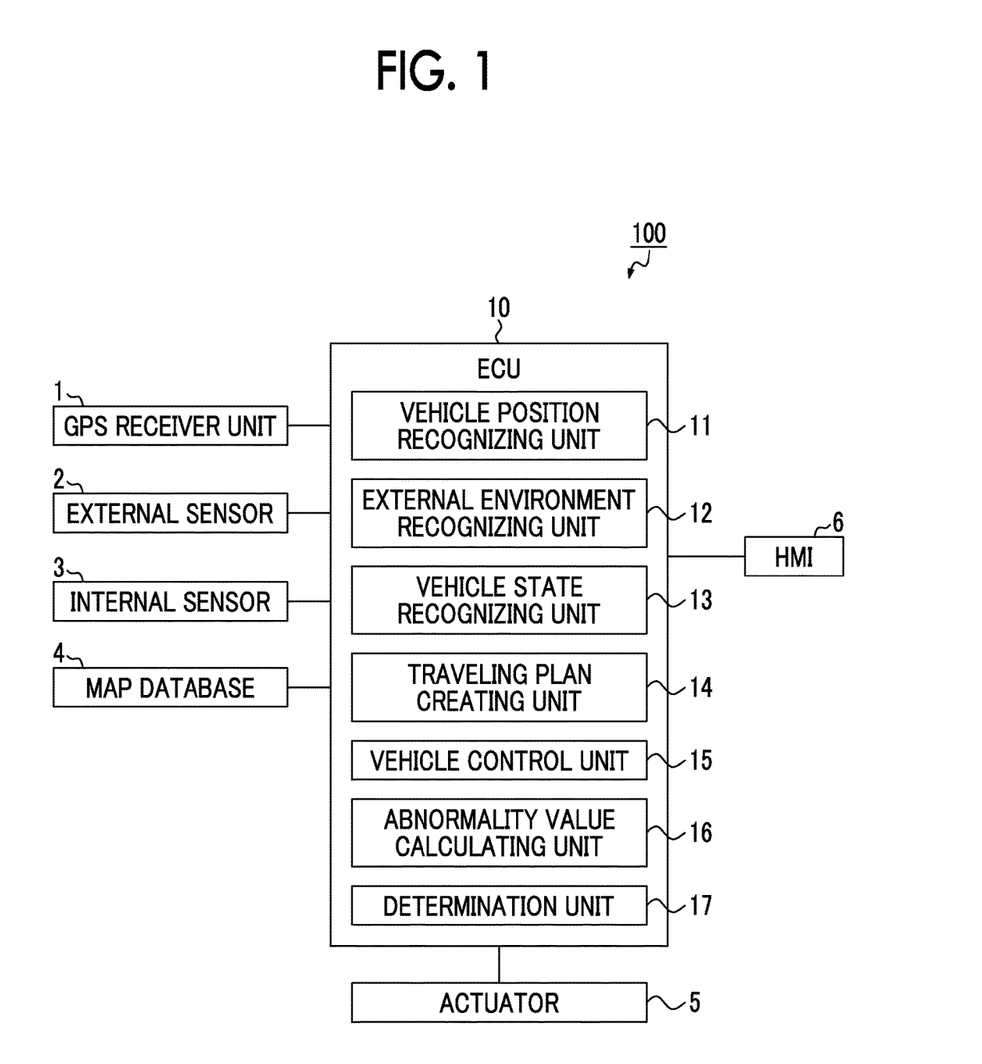
FIG. 1 is a block diagram illustrating an automatic driving system according to a first embodiment.

FIG. 1 is a block diagram illustrating an automatic driving system according to a first embodiment. An automatic driving system 100 illustrated in FIG. 1 is mounted in a vehicle such as an automobile and performs automatic driving control of the vehicle. Automatic driving control is vehicle control of causing a vehicle to travel automatically to a preset destination. In automatic driving control, an occupant does not need to perform a driving operation and the vehicle travels automatically.

<Configuration of Automatic Driving System According to First Embodiment>

As illustrated in FIG. 1, the automatic driving system 100 includes an electronic control unit (ECU) 10 that comprehensively controls the system. The ECU 10 is an electronic control unit including a central processing unit (CPU), a read only memory (ROM), a random access memory (RAM), and a controller area network (CAN) communication circuit. The ECU 10 embodies various functions, for example, by loading a program stored in the ROM into the RAM and causing the CPU to execute the program loaded into the RAM. The ECU 10 may include a plurality of electronic control units.

The ECU 10 is connected to a GPS receiver unit 1, an external sensor 2, an internal sensor 3, a map database 4, an actuator 5, and a human-machine interface (HMI) 6.

The GPS receiver unit 1 measures a position of the vehicle (for example, a latitude and longitude of the vehicle) by receiving signals from three or more GPS satellites. The GPS receiver unit 1 transmits information on the measured position of the vehicle to the ECU 10.

The external sensor 2 is a detection device that detects surrounding conditions of the vehicle. The external sensor 2 includes at least one of a camera and a radar sensor.

The camera is an imaging device that images external conditions of the vehicle. The camera is installed behind a front windshield of the vehicle. The camera transmits imaging information on the external conditions of the vehicle to the ECU 10. The camera may be a monocular camera or a stereoscopic camera. The stereoscopic camera includes two imaging units that are arranged to reproduce binocular parallax.

The radar sensor is a detection device that detects an obstacle near the vehicle using radio waves (for example, 1 to 10 millimeter radio waves) or light. Examples of the radar sensor include a millimeter wave radar and a LIDAR (LIDAR: light detection and ranging). The radar sensor detects an obstacle by transmitting radio waves or light to the surroundings of the vehicle and receiving radio waves or light reflected by the obstacle. The radar sensor transmits information on the detected obstacle to the ECU 10. Examples of the obstacle include stationary obstacles such as guard rails and buildings and mobile obstacles such as pedestrians, bicycles, and other vehicles.

The internal sensor 3 is a detection device that detects a vehicle state of the vehicle. The internal sensor 3 includes a vehicle speed sensor, an acceleration sensor, and a yaw rate sensor. The vehicle speed sensor is a detector that detects a speed of the vehicle. For example, a wheel speed sensor that is disposed on vehicle wheels of the vehicle or a drive shaft rotating with the vehicle wheels and detects a rotation speed of the vehicle wheels may be used as the vehicle speed sensor. The vehicle speed sensor transmits information on the detected vehicle speed to the ECU 10.

The acceleration sensor is a detector that detects acceleration of the vehicle. For example, the acceleration sensor includes a longitudinal acceleration sensor that detects acceleration in a longitudinal direction of the vehicle and a lateral acceleration sensor that detects lateral acceleration of the vehicle. For example, the acceleration sensor transmits information on the detected acceleration of the vehicle to the ECU 10. The yaw rate sensor is a detector that detects a yaw rate (a rotational angular velocity) around a vertical axis at the center of gravity of the vehicle. For example, a gyro sensor can be used as the yaw rate sensor. The yaw rate sensor transmits information on the detected yaw rate of the vehicle to the ECU 10.

The map database 4 is a database in which map information is stored. For example, the map database 4 is stored in a hard disk drive (HDD) which is mounted in the vehicle. The map information includes, for example, position information of roads, information on road shapes (such as curves, types of straight section, and curvatures of curves), position information of crossings and junctions, and position information of structures. The map database 4 may be stored in a computer of a facility such as a management center that can communicate with the vehicle.

The actuator 5 is a device that is used to control the vehicle. The actuator 5 includes at least a drive actuator, a brake actuator, and a steering actuator. The drive actuator controls an amount of air supplied (a throttle valve opening) to an engine in accordance with a control signal from the ECU 10, and controls a driving force of the vehicle. When the vehicle is a hybrid vehicle, a control signal from the ECU 10 is input to a motor serving as a power source and a driving force thereof is controlled in addition to the amount of air supplied to the engine. When the vehicle is an electric vehicle, a control signal from the ECU 10 is input to a motor (a motor serving as an engine) serving as a power source and a driving force thereof is controlled. The motor serving as a power source in this case constitutes the actuator 5.

The brake actuator controls a brake system in accordance with a control signal from the ECU 10 and controls a braking force which is applied to the vehicle wheels of the vehicle. For example, a hydraulic brake system can be used as the brake system. The steering actuator controls driving of an assist motor that controls a steering torque in an electric power steering system in accordance with a control signal from the ECU 10. Accordingly, the steering actuator controls a steering torque of the vehicle.

The HMI 6 is an interface that is used to output and input information between the automatic driving system 100 and an occupant. The HMI 6 includes, for example, a display and a speaker. The HMI 6 performs output of an image via the display and output of speech via the speaker in accordance with a control signal from the ECU 10. The display may be a head-up display. The HMI 6 includes, for example, an input device (such as a button, a touch panel and a speech input device) that is used to receive an input from an occupant.

The functional configuration of the ECU 10 will be described below. The ECU 10 includes a vehicle position recognizing unit 11, an external environment recognizing unit 12, a vehicle state recognizing unit 13, a traveling plan creating unit 14, a vehicle control unit 15, an abnormality value calculating unit 16, and a determination unit 17. Some functions of the ECU 10 may be performed by a server that can communicate with the vehicle.

The vehicle position recognizing unit 11 recognizes a position on a map of the vehicle based on the position information from the GPS receiver unit 1 and the map information in the map database 4. The vehicle position recognizing unit 11 recognizes the position of the vehicle using a simultaneous localization and mapping (SLAM) technique based on the position information of stationary obstacles such as electricity poles which are included in the map information in the map database 4 and the detection results from the external sensors 2. The vehicle position recognizing unit 11 may recognize the position on a map of the vehicle using other known methods.

The external environment recognizing unit 12 recognizes an external environment of the vehicle based on the detection result from the external sensor 2. The external environment includes a position of an obstacle relative to the vehicle, a speed of an obstacle relative to the vehicle, and a moving direction of an obstacle relative to the vehicle. The external environment recognizing unit 12 recognizes the external environment of the vehicle using a known method based on captured images of the camera and obstacle information from the radar sensor.

The vehicle state recognizing unit 13 recognizes a vehicle state of the vehicle during traveling based on the detection result from the internal sensor 3. The vehicle state includes a vehicle speed of the vehicle, an acceleration of the vehicle, and a yaw rate of the vehicle. The vehicle state recognizing unit 13 recognizes the vehicle speed of the vehicle based on the vehicle speed information from the vehicle speed sensor. The vehicle state recognizing unit 13 recognizes the acceleration (longitudinal acceleration and lateral acceleration) of the vehicle based on the acceleration information from the acceleration sensor. The vehicle state recognizing unit 13 recognizes the yaw rate of the vehicle based on the yaw rate information from the yaw rate sensor.

The traveling plan creating unit 14 creates a traveling plan for automatic driving control based on the map information in the map database 4, the position on a map of the vehicle recognized by the vehicle position recognizing unit 11, the external environment of the vehicle recognized by the external environment recognizing unit 12, and the vehicle state of the vehicle recognized by the vehicle state recognizing unit 13. The traveling plan creating unit 14 creates a normal traveling plan or an abnormal traveling plan as a traveling plan. In the following description, the normal traveling plan will be first described and then the abnormal traveling plan will be described later.

The normal traveling plan includes control target values which are used to execute automatic driving control of the vehicle. The control target values include a target vehicle speed and a target trajectory. The target vehicle speed is a value which serves as a control target of the vehicle speed of the vehicle in the normal traveling plan. The target trajectory is values which serve as a control target of a trajectory on which the vehicle travels. A target steering angle which is a control target of the steering angle of the vehicle is calculated from the target trajectory.

The target vehicle speed is set according to a position on a route on which the vehicle travels due to automatic driving control. The route on which the vehicle travels by automatic driving control is a target route of automatic driving control that connects a preset destination to a current position on a map of the vehicle. Positions on a route are positions on a map in a direction in which a route extends. Specifically, positions on a route can be set at positions along the length which are set at predetermined intervals (for example, every 1 m) in the direction in which the route extends. The method of setting the set longitudinal position is not limited to the above-mentioned method. In the normal traveling plan, a target vehicle speed is set for each set longitudinal position.

A target acceleration or a target jerk may be used instead of the target vehicle speed. In addition to the target trajectory, a target steering angle, a target steering angular velocity, a target steering torque, or a target lateral position (a position in a width direction of a road which serves as a target of the vehicle) may be set for each set longitudinal position. A known parameter associated with control of a vehicle may be added to the control target value.

The traveling plan creating unit 14 creates the normal traveling plan such that the control target value is equal to or less than a preset maximum allowable value. The maximum allowable value of the control target value is a maximum value which can be set as the control target value of the vehicle in creation of the normal traveling plan. Comparison of numerical values is performed using absolute values thereof. The traveling plan creating unit 14 limits the control target value by also considering that a command value for the actuator 5 which is required for achieving the control target value is not greater than an allowable upper limit of the actuator 5.

Specifically, when the maximum allowable value of the target vehicle speed is set, the traveling plan creating unit 14 creates the normal traveling plan such that the target vehicle speed of the vehicle in which automatic driving control is performed is not greater than the maximum allowable value. Similarly, when the maximum allowable value of the target steering angle is set, the traveling plan creating unit 14 creates the normal traveling plan such that the target steering angle of the vehicle in which automatic driving control is performed is not greater than the maximum allowable value. The maximum allowable value is set using a known method from the viewpoint of ride quality of an occupant of the vehicle or the like. The traveling plan creating unit 14 can create the normal traveling plan using a known method associated with creation of a traveling plan.

The vehicle control unit 15 executes automatic driving control in accordance with the normal traveling plan. The vehicle control unit 15 executes the automatic driving control based on the map information in the map database 4, the position on a map of the vehicle from the vehicle position recognizing unit 11, the external environment of the vehicle from the external environment recognizing unit 12, the vehicle state from the vehicle state recognizing unit 13, and the control target value of the normal traveling plan created by the traveling plan creating unit 14.

The vehicle control unit 15 calculates a command value which is transmitted to the actuator 5 based on the control target value of the normal traveling plan. The vehicle control unit 15 can calculate a command value from the control target value using a known method.

The command value includes a driving force command value (or an acceleration command value) which is transmitted to the drive actuator (or a motor of an electric vehicle), a deceleration command value which is transmitted to the brake actuator, and a steering angle command value (or a steering torque command value) which is transmitted to the steering actuator. The vehicle control unit 15 calculates the driving force command value or the deceleration command value, for example, such that the vehicle speed of the vehicle reaches the target vehicle speed which is set as the set longitudinal position at which the vehicle arrives next. The vehicle control unit 15 calculates the steering angle command value such that the steering angle of the vehicle reaches the target steering angle which is set as the set longitudinal position at which the vehicle arrives next. The vehicle control unit 15 controls traveling of the vehicle by the automatic driving control by transmitting the calculated driving force command value or the like to the actuator 5. That is, traveling in which the vehicle follows the target trajectory at the target vehicle speed is realized.

The abnormality value calculating unit 16 calculates an abnormality value based on the control target value (the command value) and the vehicle state (the vehicle speed, the yaw rate, the acceleration/deceleration, and the like) of the vehicle corresponding to the control target value (the command value) during execution of automatic driving control. The abnormality value is a value associated with an abnormality of the vehicle which is subjected to automatic driving control. The abnormality value calculating unit 16 calculates an abnormality value from a difference between the command value and an actual vehicle state by comparing the command value calculated by the vehicle control unit 15 with the actual vehicle state which is a result of driving of the actuator 5 in accordance with the command value.

Specifically, the abnormality value calculating unit 16 calculates an absolute value of a difference between the target vehicle speed (the driving force command value) of the normal traveling plan and the actual vehicle speed (the vehicle speed which is a result of driving of the drive actuator in accordance with the driving force command value). When the absolute value of the difference between the target vehicle speed and the actual vehicle speed is equal to or greater than a vehicle speed threshold value, the abnormality value calculating unit 16 calculates the absolute value as the abnormality value. When the absolute value is less than the vehicle speed threshold value, the abnormality value calculating unit 16 does not calculate the abnormality value associated with the vehicle speed. The vehicle speed threshold value is, for example, a threshold value which is set to avoid calculation of a detection error of a sensor as the abnormality value. The same is true of a yaw rate threshold value, a lateral acceleration threshold value, and an acceleration threshold value which will be described later.

The abnormality value calculating unit 16 calculates an absolute value of a difference between the target yaw rate and the actual yaw rate of the vehicle by calculating the target yaw rate from the target trajectory and the target vehicle speed in the normal traveling plan. When the absolute value of the difference between the target yaw rate and the actual yaw rate of the vehicle is equal to or greater than a yaw rate threshold value, the abnormality value calculating unit 16 calculates the absolute value as the abnormality value. When the absolute value is less than the yaw rate threshold value, the abnormality value calculating unit 16 does not calculate the abnormality value associated with the yaw rate.

The abnormality value calculating unit 16 calculates an absolute value of a difference between the target longitudinal acceleration and the actual longitudinal acceleration of the vehicle by calculating the target longitudinal acceleration (front-rear acceleration) from the target trajectory and the target vehicle speed in the normal traveling plan. When the absolute value of the difference between the target longitudinal acceleration and the actual longitudinal acceleration of the vehicle is equal to or greater than a longitudinal acceleration threshold value, the abnormality value calculating unit 16 calculates the absolute value as the abnormality value. When the absolute value is less than the longitudinal acceleration threshold value, the abnormality value calculating unit 16 does not calculate the abnormality value associated with the longitudinal acceleration. The abnormality value calculating unit 16 calculates an absolute value of a difference between the target lateral acceleration and the actual lateral acceleration of the vehicle by calculating the target lateral acceleration from the target trajectory and the target vehicle speed in the normal traveling plan. When the absolute value of the difference between the target lateral acceleration and the actual lateral acceleration of the vehicle is equal to or greater than a lateral acceleration threshold value, the abnormality value calculating unit 16 calculates the absolute value as the abnormality value. When the absolute value is less than the lateral acceleration threshold value, the abnormality value calculating unit 16 does not calculate the abnormality value associated with the lateral acceleration.

The abnormality value calculating unit 16 does not need to use a threshold value, and may calculate the absolute value as the abnormality value when the absolute value of the difference between the target vehicle speed and the actual vehicle speed is not zero. The abnormality value calculating unit 16 has only to calculate at least one abnormality value of the abnormality value associated with the vehicle speed, the abnormality value associated with the yaw rate, the abnormality value associated with the lateral acceleration, and the abnormality value associated with the longitudinal acceleration. When the abnormality values associated with a plurality of types such as the vehicle speed and the yaw rate have been calculated, the abnormality value calculating unit 16 may output only the abnormality value having the largest value.

The determination unit 17 determines whether the vehicle is in a normal state, an abnormal state, or an intermediate state based on the abnormality value calculated by the abnormality value calculating unit 16. The normal state is a state in which automatic driving control is normally executed. When a vehicle is in the normal state, it means, for example, that a system of the vehicle is in the normal state. The abnormal state is a state in which execution of automatic driving control is abnormal. When a vehicle is in the abnormal state, it means, for example, that a system of the vehicle is in the abnormal state. The intermediate state is a state between the normal state and the abnormal state. The determination unit 17 determines that the vehicle is in the intermediate state when it is not determined that the vehicle is in the normal state or the abnormal state.

Specifically, when the abnormality value is less than a first threshold value, the determination unit 17 determines that the vehicle is in the normal state. The first threshold value is a threshold value which is preset for determination of the vehicle state. When the abnormality value is equal to or greater than the first threshold value and less than a second threshold value, the determination unit 17 determines that the vehicle is in the intermediate state. The second threshold value is a threshold value which is preset for determination of the vehicle state and is a threshold value which is greater than the first threshold value. When the abnormality value is equal to or greater than the second threshold value, the determination unit 17 determines that the vehicle is in the abnormal state. The determination unit 17 may determine the vehicle state from the abnormality value using another method.

<Normal State>

A case in which the determination unit 17 has determined that the vehicle is in the normal state will be described below. In this case, the traveling plan creating unit 14 creates the normal traveling plan as the traveling plan. The normal traveling plan is the same as described above. The vehicle control unit 15 executes automatic driving control based on the normal traveling plan by transmitting a command value to the actuator 5 of the vehicle based on the control target value in the normal traveling plan.

<Abnormal State>

A case in which the determination unit 17 has determined that the vehicle is in the abnormal state will be described below. In this case, the traveling plan creating unit 14 creates the abnormal traveling plan as the traveling plan. The abnormal traveling plan is a traveling plan in which at least one of the control target value, the maximum allowable value of the control target value, and the maximum allowable value of the temporal variation of the control target value is less than that in the normal traveling plan. The abnormal traveling plan is, for example, a traveling plan in which at least one of a speed, a speed variation, a steering angle, and a steering angle variation is less than that in the normal traveling plan.

When the control target value is less than that in the normal traveling plan, it means that at least one of the control target values for each set longitudinal position on a route of the vehicle in the abnormal traveling plan is less than that in the normal traveling plan. In this case, comparison of numerical values is performed using absolute values thereof. The same is true of the following description. However, when the target acceleration is minus and the actual acceleration is plus, the actual values are compared instead of the absolute values thereof.

Specifically, the target vehicle speed in the abnormal traveling plan can be set to a value which is less than the target vehicle speed in the normal traveling plan when the value is compared in at least one set longitudinal position. Similarly, the target steering angle in the abnormal traveling plan can be set to a value which is less than the target steering angle in the normal traveling plan when the value is compared in at least one set longitudinal position. The control target value in the abnormal traveling plan is not greater than the control target value in the normal traveling plan. The traveling plan creating unit 14 creates, for example, an abnormal traveling plan in which the target vehicle speed is set to be less than that in the normal traveling plan such that an emergency braking distance can be satisfactorily secured.

When the maximum allowable value of the control target value is less than that in the normal traveling plan, it means that at least one of the maximum allowable value of the target vehicle speed and the maximum allowable value of the target steering angle in the abnormal traveling plan is less than that in the normal traveling plan.

Specifically, the maximum allowable value of the target vehicle speed which is allowed in the abnormal traveling plan can be set to be less than the maximum allowable value of the target vehicle speed which is allowed in the normal traveling plan. The maximum allowable value of the target steering angle which is allowed in the abnormal traveling plan can be set to be less than the maximum allowable value of the target steering angle which is allowed in the normal traveling plan. One of the maximum allowable value of the target vehicle speed and the maximum allowable value of the target steering angle in the abnormal traveling plan has only to be less than that in the normal traveling plan. The maximum allowable value of the control target value in the abnormal traveling plan is not greater than the maximum allowable value of the control target value in the normal traveling plan. The traveling plan creating unit 14 creates, for example, an abnormal traveling plan in which the maximum allowable value of the target steering angle is set to be less than that in the normal traveling plan such that a turning radius is enlarged with a margin.

When the maximum allowable value of the temporal variation of the control target value is less than that in the normal traveling plan, it means that at least one of the maximum allowable value of the temporal variation of the target vehicle speed and the maximum allowable value of the temporal variation of the target steering angle of the abnormal traveling plan is less than that in the normal traveling plan. The temporal variation of the target vehicle speed corresponds to an acceleration. The temporal variation of the target steering angle corresponds to a steering angular velocity.

Specifically, the maximum allowable value of the temporal variation of the target vehicle speed which is allowed in the abnormal traveling plan can be set to be less than the maximum allowable value of the temporal variation of the target vehicle speed which is allowed in the normal traveling plan. The traveling plan creating unit 14 creates, for example, an abnormal traveling plan in which the maximum allowable value of the temporal variation of the target vehicle speed is less than that in the normal traveling plan such that slipping due to sudden acceleration or deceleration is avoided.

The maximum allowable value of the temporal variation of the target steering angle which is allowed in the abnormal traveling plan can be set to be less than the maximum allowable value of the temporal variation of the target steering angle which is allowed in the normal traveling plan. One of the maximum allowable value of the temporal variation of the target vehicle speed and the maximum allowable value of the temporal variation of the target steering angle in the abnormal traveling plan has only to be less than that in the normal traveling plan. The maximum allowable value of the temporal variation of the control target value in the abnormal traveling plan is not greater than the maximum allowable value of the temporal variation of the control target value in the normal traveling plan.

The traveling plan creating unit 14 may use a target acceleration as the control target value. In this case, a temporal variation of the target acceleration corresponds to a jerk. The traveling plan creating unit 14 creates, for example, an abnormal traveling plan in which the maximum allowable value of the temporal variation of the target acceleration is set to be less than that in the normal traveling plan such that slipping due to sudden acceleration or deceleration is avoided.

The maximum allowable value of the control target value and the maximum allowable value of the temporal variation of the control target value which are used in the abnormal traveling plan may be stored in an onboard parameter database. The parameter database does not need to be mounted in the vehicle, but may be mounted in a server that can communicate with the vehicle.

The traveling plan creating unit 14 creates an abnormal traveling plan such that at least one of a control target value, the maximum allowable value of the control target value, and the maximum allowable value of the temporal variation of the control target value varies based on the abnormality value calculated by the abnormality value calculating unit 16.

Figure 2:
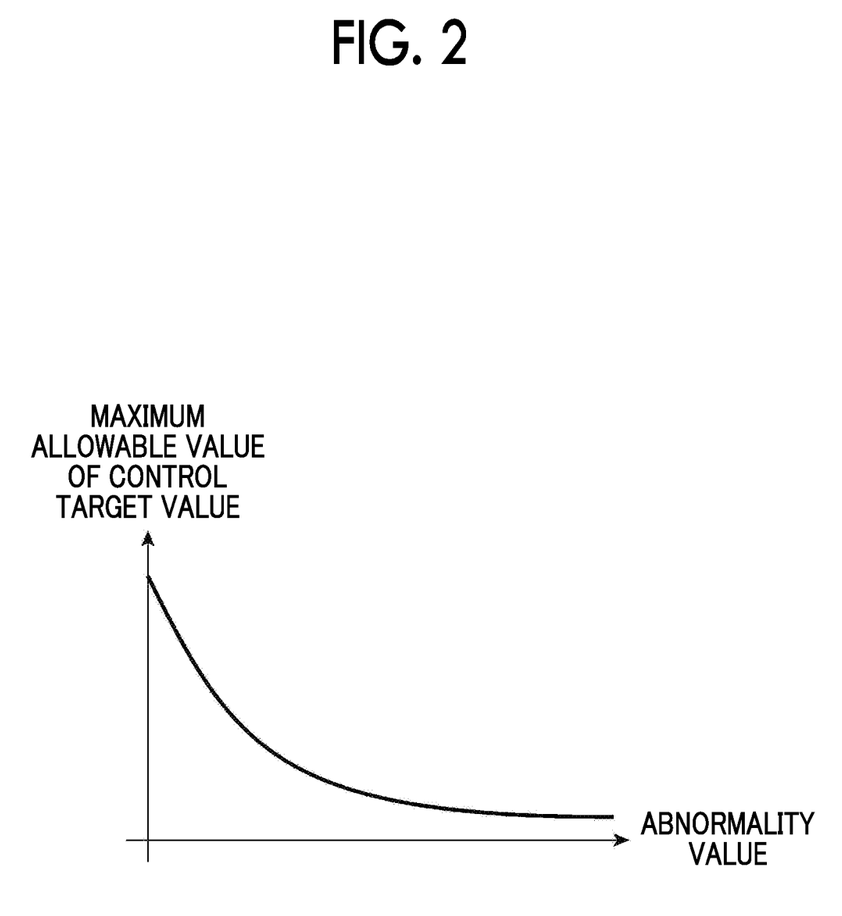
FIG. 2 is a graph illustrating a relationship between an abnormality value and a control target value in an abnormal traveling plan.

FIG. 2 is a graph illustrating a relationship between an abnormality value and a maximum allowable value of a control target value in the abnormal traveling plan. In the graph, the horizontal axis represents the abnormality value and the vertical axis represents the maximum allowable value of a control target value. As illustrated in FIG. 2, the traveling plan creating unit 14 changes the maximum allowable value of the control target value according to the abnormality value. The traveling plan creating unit 14 sets the maximum allowable value of the control target value in the abnormal traveling plan to decrease as the abnormality value increases.

The traveling plan creating unit 14 does not need to continuously change the maximum allowable value of the control target value according to the abnormality value. The traveling plan creating unit 14 may stepwise change the maximum allowable value of the control target value according to the abnormality value. When the abnormality value is equal to or greater than a predetermined threshold value, the traveling plan creating unit 14 may set the maximum allowable value of the control target value to be less than that when the abnormality value is less than the predetermined threshold value. The traveling plan creating unit 14 may calculate the maximum allowable value of the control target value from the abnormality value using map data in which abnormality values are correlated with maximum allowable values of control target values.

The traveling plan creating unit 14 may change the control target value or the maximum allowable value of the temporal variation of the control target value instead of the maximum allowable value of the control target value according to the abnormality value. The control target value or the maximum allowable value of the temporal variation of the control target value can also be set to decrease continuously or stepwise according to the abnormality value similarly to the maximum allowable value of the control target value.

The vehicle control unit 15 executes automatic driving control in accordance with the abnormal traveling plan by transmitting a command value to the actuator 5 of the vehicle based on the control target value in the abnormal traveling plan. By executing automatic driving control in accordance with the abnormal traveling plan, the vehicle control unit 15 can curb destabilization of the vehicle in contrast to a case in which the normal traveling plan is used.

When the determination unit 17 has determined that the vehicle is in the abnormal state, the vehicle control unit 15 may notify an occupant (including a driver) that the vehicle is in the abnormal state via the HMI 6. When there is an abnormality value, the vehicle control unit 15 may notify an occupant thereof. The vehicle control unit 15 may notify an occupant that the vehicle is in the abnormal state and thus automatic driving control cannot be continuously executed and may change the automatic driving control to manual driving control (override). The vehicle control unit 15 can perform override using a known method. The vehicle control unit 15 may not permit restart of automatic driving control until the abnormality value is less than a predetermined threshold value after the override has been performed.

<Intermediate State>

A case in which the determination unit 17 has determined that the vehicle is in the intermediate state will be described below. In this case, the traveling plan creating unit 14 creates the previously created traveling plan of the normal traveling plan and the abnormal traveling plan as the traveling plan. That is, the traveling plan creating unit 14 continues to create the previously created traveling plan of the normal traveling plan and the abnormal traveling plan when the vehicle is in the intermediate state. The vehicle control unit 15 executes automatic driving control in accordance with the normal traveling plan or the abnormal traveling plan created by the traveling plan creating unit 14. The previously created traveling plan refers to a normal traveling plan or an abnormal traveling plan which has been created at an immediately previous time of the traveling plans which are repeatedly created at predetermined times during execution of automatic driving control.

<Processes of Automatic Driving System According to First Embodiment>

Hereinafter, processes which are performed by the automatic driving system 100 according to the first embodiment will be described.

<Routine of Automatic Driving Control Executing Process>

Figure 3:
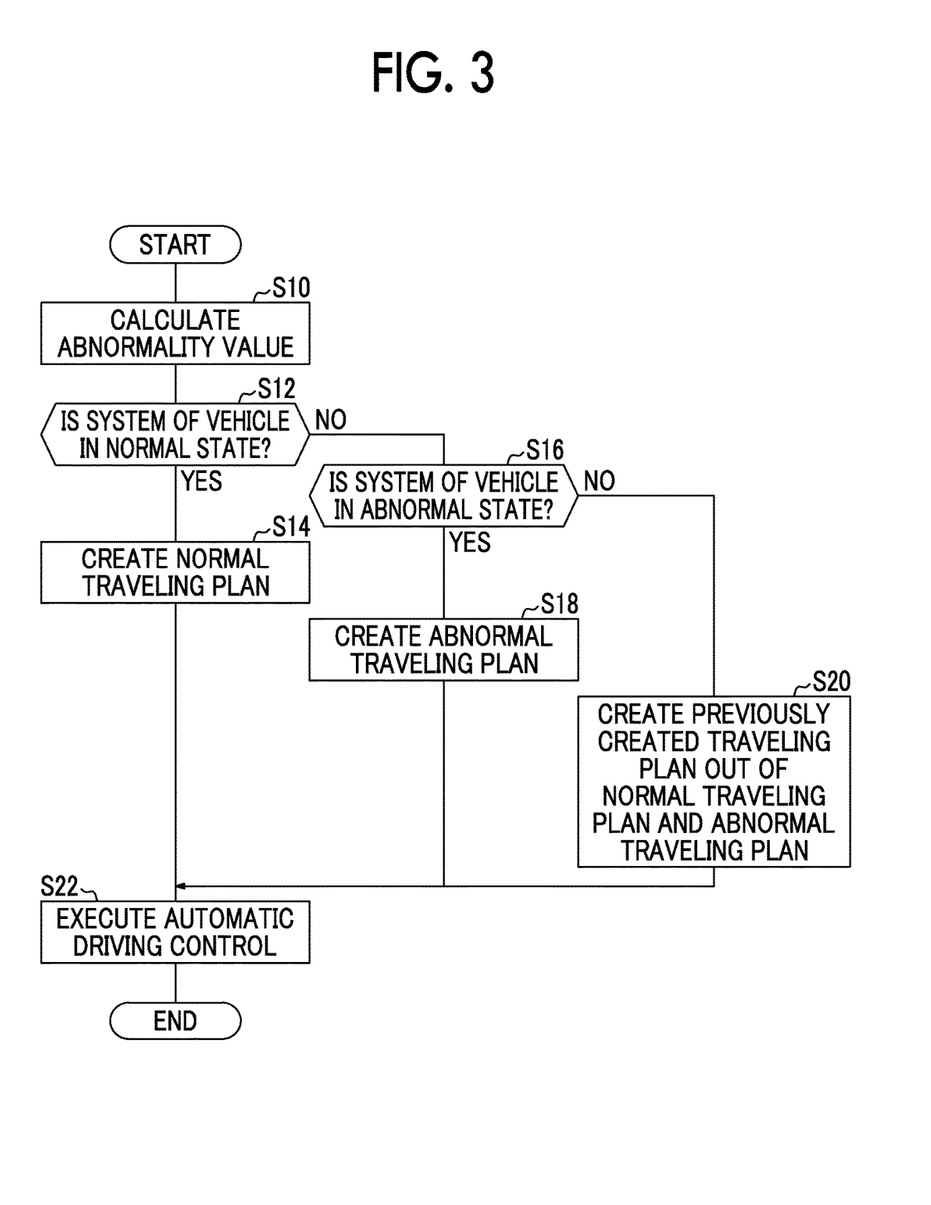
FIG. 3 is a flowchart illustrating a routine of an automatic driving control executing process.

FIG. 3 is a flowchart illustrating a routine of an automatic driving control executing process. The routine of the flowchart illustrated in FIG. 3 is performed during execution of automatic driving control.

As illustrated in FIG. 3, the ECU 10 of the automatic driving system 100 causes the abnormality value calculating unit 16 to calculate an abnormality value in S10. The abnormality value calculating unit 16 calculates an abnormality value based on a command value and a vehicle state of the vehicle corresponding to the command value during execution of automatic driving control.

In S12, the ECU 10 causes the determination unit 17 to determine whether a system of the vehicle is in the normal state. When the abnormality value is less than the first threshold value, the determination unit 17 determines that the system of the vehicle is in the normal state. When it is determined that the system of the vehicle is in the normal state (YES in S12), the ECU 10 transitions the routine to S14. When it is determined that the system of the vehicle is not in the normal state (NO in S12), the ECU 10 transitions the routine to S16.

In S14, the ECU 10 causes the traveling plan creating unit 14 to create a normal traveling plan. The traveling plan creating unit 14 creates the normal traveling plan based on the map information in the map database 4, the position on a map of the vehicle recognized by the vehicle position recognizing unit 11, the external environment of the vehicle recognized by the external environment recognizing unit 12, and the vehicle state of the vehicle recognized by the vehicle state recognizing unit 13. Thereafter, the ECU 10 transitions the routine to S22.

In S16, the ECU 10 causes the determination unit 17 to determine whether the system of the vehicle is in the abnormal state. The determination unit 17 determines that the system of the vehicle is in the abnormal state when the abnormality value is equal to or greater than the second threshold value. When it is determined that the system of the vehicle is in the abnormal state (YES in S16), the ECU 10 transitions the routine to S18. When it is determined that the system of the vehicle is not in the abnormal state (NO in S16), the ECU 10 transitions the routine to S20. The case in which the determination result of S16 is NO corresponds to a case in which it is determined that the system of the vehicle is in the intermediate state.

In S18, the ECU 10 causes the traveling plan creating unit 14 to create an abnormal traveling plan. The traveling plan creating unit 14 creates the abnormal traveling plan based on the map information in the map database 4, the position on a map of the vehicle recognized by the vehicle position recognizing unit 11, the external environment of the vehicle recognized by the external environment recognizing unit 12, and the vehicle state of the vehicle recognized by the vehicle state recognizing unit 13. The routine of the abnormal traveling plan creating process will be described later in detail. Thereafter, the ECU 10 transitions the routine to S22.

In S20, the ECU 10 causes the traveling plan creating unit 14 to create the previously created traveling plan of the normal traveling plan and the abnormal traveling plan. Thereafter, the ECU 10 transitions the routine to S22.

In S22, the ECU 10 causes the vehicle control unit 15 to execute automatic driving control. The vehicle control unit 15 executes automatic driving control of the vehicle by transmitting a command value to the actuator 5 of the vehicle based on the control target value in the normal traveling plan and the abnormal traveling plan created by the traveling plan creating unit 14. Thereafter, the ECU 10 repeatedly performs the routine from S10 when automatic driving control continues to be executed.

<Abnormal Traveling Plan Creating Process>

Figure 4:
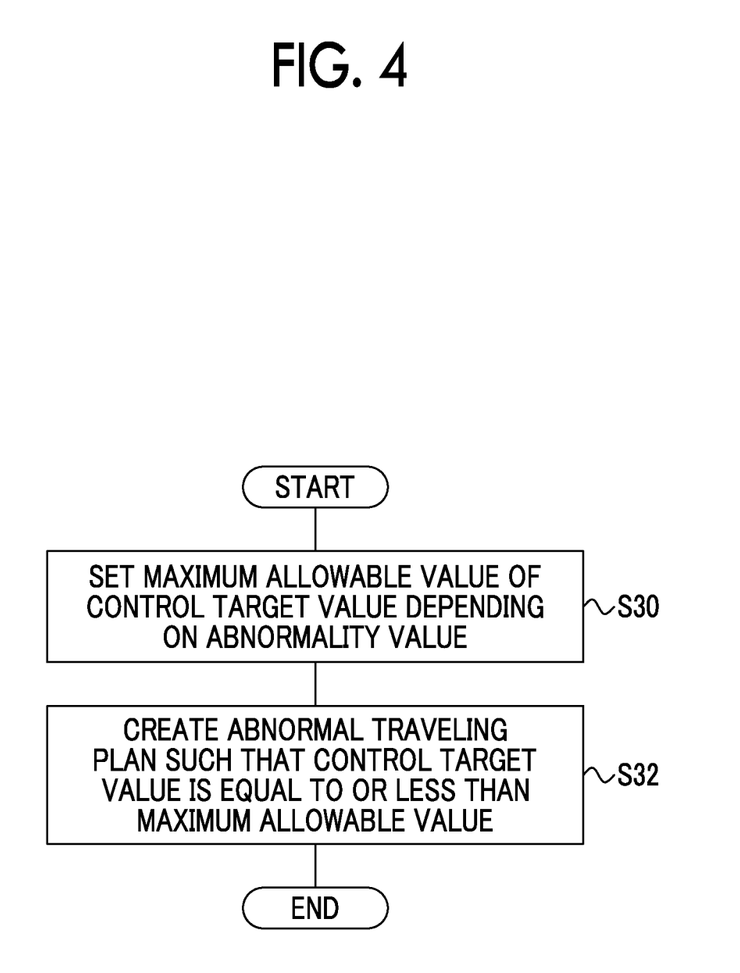
FIG. 4 is a flowchart illustrating a routine of an abnormal traveling plan creating process.

FIG. 4 is a flowchart illustrating a routine of the abnormal traveling plan creating process. Here, an example in which the maximum allowable value of the control target value is changed according to the abnormality value will be described.

As illustrated in FIG. 4, the ECU 10 causes the traveling plan creating unit 14 to set the maximum allowable value of the control target value according to the abnormality value in S30. The traveling plan creating unit 14 may set the maximum allowable value of the control target value to decrease as the abnormality value increases using map data in which abnormality values are correlated with maximum allowable values of control target values.

In S32, the ECU 10 causes the traveling plan creating unit 14 to create an abnormal traveling plan. The traveling plan creating unit 14 creates the abnormal traveling plan such that the control target value is equal to or less than the maximum allowable value.

<Operational Advantages of Automatic Driving System According to First Embodiment>

In the automatic driving system 100 according to the first embodiment, since it can be determined whether the vehicle is in the normal state, the abnormal state, or the intermediate state by calculating the abnormality value based on the command value for the actuator 5 of the vehicle and the vehicle state corresponding to the command value during execution of automatic driving control and a normal traveling plan or an abnormal traveling plan can be created based on the determination result, it is possible to create an appropriate traveling plan according to the vehicle state. In the automatic driving system 100, since the abnormal traveling plan is a traveling plan in which at least one of the control target value, the maximum allowable value of a control target value, and the maximum allowable value of the temporal variation of the control target value is less than that in the normal traveling plan, it is possible to curb destabilization of behavior of the vehicle when the vehicle is in the abnormal state in contrast to a case in which the vehicle is in the normal state.

In the automatic driving system 100, since at least one of a control target value, the maximum allowable value of the control target value, and the maximum allowable value of the temporal variation of the control target value is changed according to the abnormality value, it is possible to create an abnormal traveling plan in which the vehicle state is reflected in contrast to a case in which the maximum allowable value of the control target value or the like is set to a fixed value regardless of the abnormality value.

Second Embodiment

Figure 5:
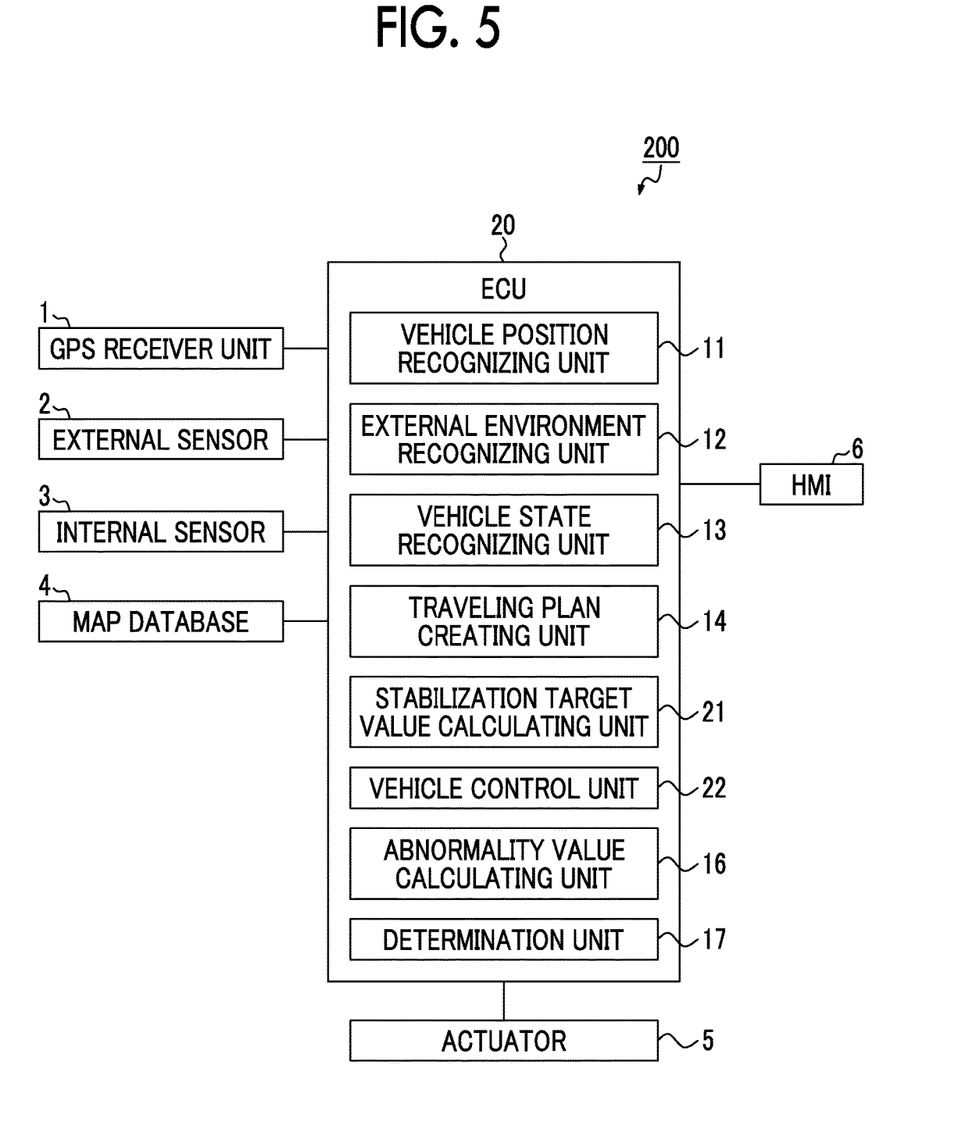
FIG. 5 is a block diagram illustrating an automatic driving system according to a second embodiment.

FIG. 5 is a block diagram illustrating an automatic driving system according to a second embodiment. An automatic driving system 200 according to the second embodiment illustrated in FIG. 5 is the same as that in the first embodiment, except that a command value is calculated based on a composite target value of a control target value and a stabilization target value which are mixed according to the abnormality value. The elements equal or corresponding to those in the first embodiment will be referenced by the same reference signs and description thereof will not be repeated.

<Configuration of Automatic Driving System According to Second Embodiment>

As illustrated in FIG. 5, the automatic driving system 200 according to the second embodiment includes a stabilization target value calculating unit 21 in an ECU 20. The stabilization target value calculating unit 21 calculates a stabilization target value which is a control target value for stabilizing behavior of the vehicle. The stabilization target value calculating unit 21 calculates the stabilization target value using a known method based on the vehicle state recognized by the vehicle state recognizing unit 13. The stabilization target value calculating unit 21 calculates the stabilization target value such that current behavior of the vehicle is stabilized. The stabilization target value calculating unit 21 calculates the stabilization target value, for example, such that a lateral slip of the vehicle at the time of traveling on a curved road is curbed.

A vehicle control unit 22 according to the second embodiment calculates a composite target value of a control target value (for example, a control target value at a next set longitudinal position) and the stabilization target value based on a composite proportion corresponding to an abnormality value during execution of automatic driving control. A traveling plan including a control target value may be a normal traveling plan or an abnormal traveling plan. The vehicle control unit 22 may calculate the composite proportion from the abnormality value using map data in which abnormality values are correlated with composite proportions, and may calculate the composite target value of the control target value and the stabilization target value based on the calculated composite proportion.

Figure 6:
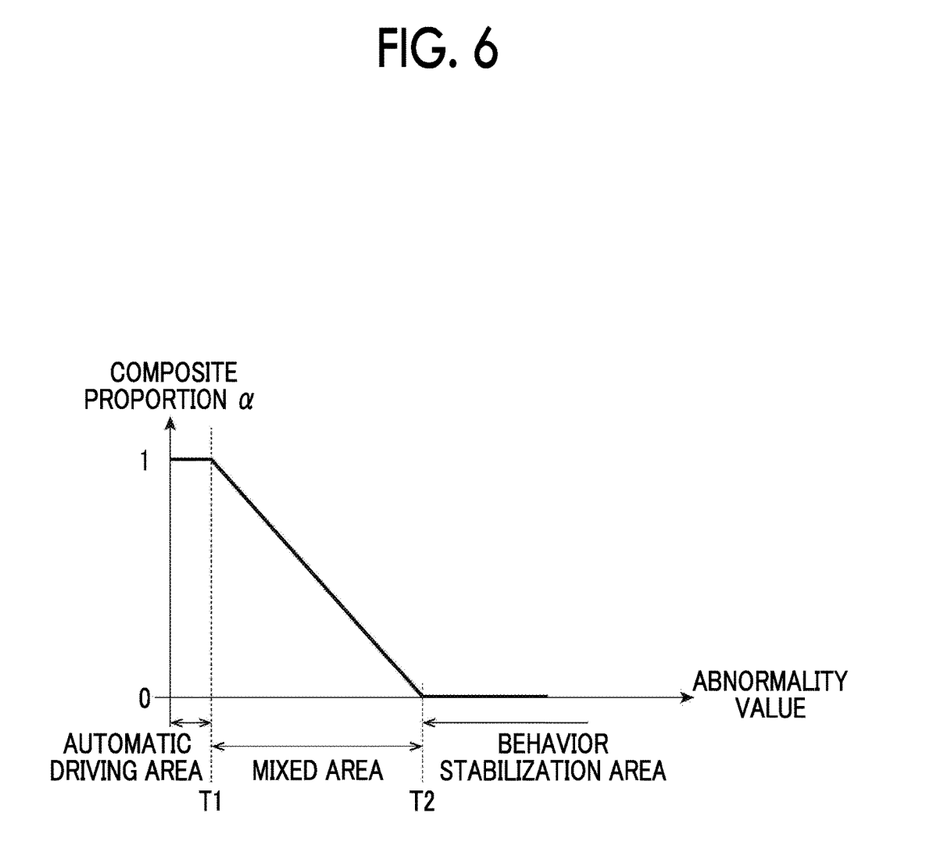
FIG. 6 is a graph illustrating a relationship between an abnormality value and composite proportions.

FIG. 6 is a graph illustrating a relationship between an abnormality value and a composite proportion. In the graph, the horizontal axis represents the abnormality value and the vertical axis represents the composite proportion α. An automatic driving area, a mixed area, and a behavior stabilization area are illustrated in FIG. 6.

The automatic driving area is an area in which the abnormality value is less than a first mixing threshold value T1. The first mixing threshold value T1 is a preset value. The mixed area is an area in which the abnormality value is equal to or greater than the first mixing threshold value T1 and less than a second mixing threshold value T2. The second mixing threshold value T2 is a preset value which is greater than the first mixing threshold value T1. The behavior stabilization area is an area in which the abnormality value is equal to or greater than the second mixing threshold value T2.

As illustrated in FIG. 6, the vehicle control unit 22 calculates "1" as the composite proportion α when the abnormality value is included in the automatic driving area. The vehicle control unit 22 calculates a value which decreases in reverse proportion to the abnormality value as the composite proportion α when the abnormality value is included in the mixed area. The vehicle control unit 22 calculates "0" as the composite proportion α when the abnormality value is included in the behavior stabilization area. When a control target value is A and a stabilization target value is B, the vehicle control unit 22 calculates a composite target value C from Equation (1).

$$C = \alpha \times A + (1-\alpha) \times B \tag{1}$$

The vehicle control unit 22 calculates the composite target value C such that an influence of the stabilization target value B increases according to the abnormality value. The vehicle control unit 22 may calculate the composite target value C such that the influence of the stabilization target value B increases as the abnormality value increases. The vehicle control unit 22 may calculate the composite proportion α from the abnormality value using a method other than illustrated in FIG. 6, and Equation (1) does not need to be used to calculate the composite target value C. For example, it is conceivable that a nonlinear function is used to calculate the composite target value.

The vehicle control unit 22 calculates a command value which is transmitted to the actuator 5 of the vehicle based on the composite target value C. The vehicle control unit 22 calculates the command value from the composite target value C in the same way as in the case in which the command value is calculated from the control target value A. The vehicle control unit 22 executes automatic driving control of the vehicle by transmitting the command value to the actuator 5.

<Processes of Automatic Driving System According to Second Embodiment>

<Command Value Calculating Process>

Figure 7:
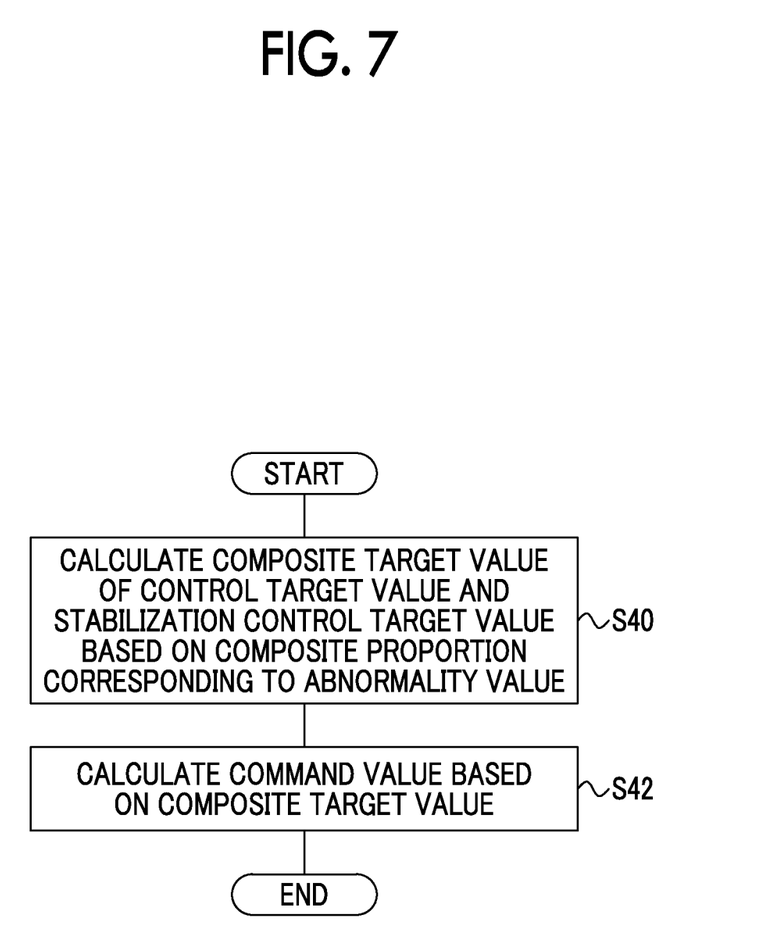
FIG. 7 is a flowchart illustrating a routine of a command value calculating process.

A process which is performed by the automatic driving system 200 according to the second embodiment will be described below. FIG. 7 is a flowchart illustrating a routine of a command value calculating process. The other processes are the same as in the first embodiment and thus description thereof will not be repeated.

As illustrated in FIG. 7, the ECU 20 of the automatic driving system 200 causes the vehicle control unit 22 to calculate the composite target value C in S40. The vehicle control unit 22 calculates a composite proportion from an abnormality value using map data in which abnormality values are correlated with composite proportions and calculates the composite target value C of a control target value and a stabilization target value based on the calculated composite proportion.

In S42, the ECU 20 causes the vehicle control unit 22 to calculate a command value based on the composite target value C. The vehicle control unit 22 calculates the command value from the composite target value C in the same way as in the case in which the command value is calculated from the control target value A.

<Operational Advantages of Automatic Driving System According to Second Embodiment>

In the above-mentioned automatic driving system 200 according to the second embodiment, since the command value which is transmitted to the actuator of the vehicle is calculated based on the composite target value corresponding to the abnormality value, it is possible to execute automatic driving control corresponding to the abnormality value of the vehicle and to curb destabilization of the vehicle.

While exemplary embodiments of the disclosure have been described above, the disclosure is not limited to the embodiments. The disclosure can be embodied in various forms including various modifications and improvements including the above-mentioned embodiments based on knowledge of those skilled in the art.

For example, the determination unit 17 may calculate a frequency at which an abnormality value exceeds an abnormality threshold value based on an abnormality value and determine the vehicle state based on the frequency at which the abnormality value exceeds the abnormality threshold value. The abnormality threshold value is a preset value. The frequency at which the abnormality value exceeds the abnormality threshold value is the number of times the abnormality value is recognized to exceed the abnormality threshold value within a predetermined time, for example. Similarly, the traveling plan creating unit 14 may change at least one of a control target value, a maximum allowable value of the control target value, and a maximum allowable value of a temporal variation of the control target value according to the frequency at which the abnormality value exceeds the abnormality threshold value at the time of creating an abnormal traveling plan. Changing of the control target value according to an abnormality value includes changing of the control target value or the like according to the frequency at which the abnormality value exceeds the abnormality threshold value.

The traveling plan creating unit 14 does not need to change at least one of a control target value, a maximum allowable value of the control target value, and a maximum allowable value of a temporal variation of the control target value according to the abnormality value at the time of creating an abnormal traveling plan.

The vehicle control unit 22 in the second embodiment may calculate a command value from the composite target value of the control target value and the stabilization target value based on the composite proportion corresponding to the abnormality value only when the traveling plan creating unit 14 has created an abnormal traveling plan. The vehicle control unit 22 may calculate a command value from the composite target value of the control target value and the stabilization target value based on the composite proportion corresponding to the abnormality value only when the determination unit 17 has determined that the vehicle is in the abnormal state. That is, the vehicle control unit 22 may directly calculate the command value from the control target value rather than from the composite target value when the traveling plan creating unit 14 has created an abnormal traveling plan and the determination unit 17 has determined that the vehicle is in the intermediate state.

What is claimed is:

1. An automatic driving system comprising:
an electronic control unit configured to
recognize a position of a vehicle on a map;
recognize a vehicle state of the vehicle;
recognize an external environment of the vehicle;
create a traveling plan including a control target value of automatic driving control of the vehicle based on the position of the vehicle on the map, the vehicle state, and the external environment;
execute the automatic driving control by transmitting, based on the control target value of the traveling plan, a command value to an actuator of the vehicle;
calculate, during execution of the automatic driving control, an abnormality value based on the command value and the vehicle state corresponding to the command value; and
determine, based on the abnormality value, whether the vehicle is an a normal state, an abnormal state, or an intermediate state, the intermediate state being a state between the normal state and the abnormal state, wherein
the electronic control unit is configured to
create a normal traveling plan as the traveling plan when it has been determined that the vehicle is in the normal state,
create an abnormal traveling plan as the traveling plan when it has been determined that the vehicle is in the abnormal state, and
create a previously created traveling plan as the traveling plan, the previously created traveling plan being the normal traveling plan or the abnormal traveling plan, when it has been determined that the vehicle is in the intermediate state, wherein
in the abnormal traveling plan, at least one of the control target value, a maximum allowable value of the control target value, and a maximum allowable value of a temporal variation of the control target value is less than that in the normal traveling plan.

2. The automatic driving system according to claim 1, wherein
the electronic control unit is configured to create the abnormal traveling plan such that at least one of the control target value, the maximum allowable value of the control target value, and the maximum allowable value of the temporal variation of the control target value varies according to the abnormality value when it has been determined that the vehicle is in the abnormal state.

3. The automatic driving system according to claim 1, wherein
the electronic control unit is configured to
calculate a stabilization target value based on the vehicle state,
calculate a composite target value of the control target value and the stabilization target value using a composite proportion corresponding to the abnormality value, and
calculate the command value, based on the composite target value, the command value being transmitted to the actuator of the vehicle.

4. The automatic driving system according to claim 1, wherein
the abnormal traveling plan is a traveling plan in which at least one of a speed, a speed variation, a steering angle, and a steering angle variation is less than that of the normal traveling plan.

5. The automatic driving system according to claim 2, wherein
the electronic control unit is configured to create the abnormal traveling plan as the traveling plan such that the maximum allowable value of the control target value in the abnormal traveling plan decreases as the abnormality value increases.

6. The automatic driving system according to claim 1, wherein
the electronic control unit is configured to calculate the abnormality value based on an absolute value of a difference between the command value and the vehicle state corresponding to the command value.

7. The automatic driving system according to claim 6, wherein
the electronic control unit is configured to
determine that the vehicle is in the normal state when the abnormality value is less than a predetermined first threshold value,
determine that the vehicle is in the intermediate state when the abnormality value is equal to or greater than the predetermined first threshold value and less than a predetermined second threshold value, and
determine that the vehicle is in the abnormal state when the abnormality value is equal to or greater than the predetermined second threshold value, the predetermined second threshold value being greater than the predetermined first threshold value.

8. The automatic driving system according to claim 3, wherein
the electronic control unit is configured to
calculate the command value based on the composite target value when it has been determined that the vehicle is in the abnormal state, and
calculate the command value based on the control target value when it has been determined that the vehicle is in the normal state or the intermediate state.

9. The automatic driving system according to claim 3, wherein
the electronic control unit is configured to calculate the stabilization target value, the stabilization target value being a target value for stabilizing behavior of the vehicle.

10. The automatic driving system according to claim 9, wherein
the electronic control unit is configured to calculate the composite target value such that an influence of the stabilization target value on the command value increases as the abnormality value increases.

* * * * *